US006498838B1

United States Patent
Schoenborn (10) Patent No.: US 6,498,838 B1
(45) Date of Patent: Dec. 24, 2002

(54) METHOD AND CIRCUIT ARRANGEMENT USED FOR RATE SETTING IN COMMUNICATIONS NETWORKS

(75) Inventor: Franz Schoenborn, Bonn (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/297,743

(22) PCT Filed: Sep. 11, 1997

(86) PCT No.: PCT/EP97/04969

§ 371 (c)(1),
(2), (4) Date: May 7, 1999

(87) PCT Pub. No.: WO98/20688

PCT Pub. Date: May 14, 1998

(30) Foreign Application Priority Data

Nov. 7, 1996 (DE) .......................................... 196 45 868

(51) Int. Cl.[7] ............................................. H04M 15/00
(52) U.S. Cl. ............... 379/111; 379/114.01; 379/220.01
(58) Field of Search .......................... 379/111, 112.08, 379/112.1, 112.06, 114.01, 114.02, 114.08, 115.01, 115.02, 115.03, 137, 138, 219, 220.01, 221.01

(56) References Cited

U.S. PATENT DOCUMENTS 5,317,566 A    5/1994  Joshi
5,488,655 A  * 1/1996  Hamlen ................... 349/115 X (List continued on next page.)

FOREIGN PATENT DOCUMENTS

DE    1 29 844    2/1978
DE   32 38 770    5/1984

(List continued on next page.)

OTHER PUBLICATIONS

Mase, K. et al., "Advanced Traffic Control Methods for Network Management", IEEE Communications Magazine, Oct., 1990, pp. 82–88.

(List continued on next page.)

Primary Examiner—Creighton Smith
(74) Attorney, Agent, or Firm—Kenyon & Kenyon (57) ABSTRACT

A dynamic communications rate setting apparatus, system and/or method is applicable to digitized and analog communications networks. This dynamic communications rate setting apparatus, system and/or method concerns the load carried by the network at the time the call attempt is made. The loads may be continuously measured on all lines above the subscriber line level, for instance, with the aid of load measuring groups. The load measuring groups may be composed of a traffic measurement unit, connected to the trunks or trunk groups and a rate calculator, or pre-calculator, which dynamically determines the rate weight, passing it on to the corresponding exchange at a higher level of the hierarchy. The rate payable for a particular call may be indicated to the calling subscriber. After the customer has dialed the last digit of the trunk code, the rate calculator may calculate the currently applicable rate as a function of the result of the latest measurement of the traffic flowing to that destination, transmitting the computed rate to the calling subscribers terminal to be displayed there. Then, the apparatus, system and/or method may assume an offer status which is maintained for a certain time. Once a decision has been taken by the calling subscriber, the dialing process may be discontinued or, after the input of the number of the person called, the rate displayed may be used for calculating the amount payable for the call. After completion of the call, the rate payable may be displayed for the calling subscriber or also for the called subscriber if both customers share the cost. In digital networks, dynamic communications rate setting may be both suitable for voice communications and any other type of electronic communications such as data and video transmissions.

16 Claims, 7 Drawing Sheets

U.S. PATENT DOCUMENTS 5,530,744 A * 6/1996 Charalambous et al. ...... 379/112 X
5,872,775 A * 2/1999 Saints et al. ............ 455/67.1 X

FOREIGN PATENT DOCUMENTS

| | | |
|---|---|---|
| DE | 33 05 978 | 8/1984 |
| DE | 42 41 762 | 6/1994 |
| DE | 195 16 364 | 11/1995 |
| DE | 195 22 988 | 1/1997 |
| EP | 0 526 118 | 2/1993 |
| EP | 0 608 066 | 7/1994 |
| EP | 0 687 116 | 12/1995 |
| JP | 59 123354 | 7/1984 |
| JP | 02 276396 | 9/1990 |
| JP | 05 130144 | 5/1993 |
| WO | WO 86 06569 | 11/1986 |
| WO | WO 94 28670 | 12/1994 |
| WO | WO 94 28683 | 12/1994 |

OTHER PUBLICATIONS

Akselrod et al., "A Stimulation Study of Advanced Routing Methods in a Multipriority Telephone Network," IEEE Transactions on Systems, Man and Cybernetics, Bd. SMC–15, Nr. 6, Nov., 1985, pp. 730–736.*

* cited by examiner

METHOD AND CIRCUIT ARRANGEMENT USED FOR RATE SETTING IN COMMUNICATIONS NETWORKS

FIELD OF THE INVENTION

The invention relates to a method and apparatus used to set rates in communications networks.

RELATED TECHNOLOGY

Methods for setting communications rates have already been employed in conventional analog communications networks. These methods allow the traffic in the networks to be controlled by the price. In the 1980s, for example, use was made of so-called "moonlight rates" based on a rigid rate structure consisting of a very limited number of rate categories. Although these methods allowed, in principle, the traffic to be controlled by the price, this approach makes possible only a very rough type of traffic control because the mere application of certain time-dependent price categories does not take into account the actual line loads.

The reference European Patent Application No. A 0 526 118 A2 purportedly concerns a system for communications rate setting in digitized or analog communications networks, implemented in wire, radio, or laser-supported terrestrial or satellite communications networks, using the terminals of a calling and a called subscriber, the system measuring the load on lines of the communications network above the subscriber terminal line, in order to include the load in the process of setting rates. The resulting measuring values are stored in special rate computers and are available upon demand. In the rate computers are computing algorithms in the form of programs which take into account the traffic load for the current rate to be determined with regard to an individual call, the current individual rate being displayed at the terminal of the calling subscriber. The load measurement is, however, not an integral component of the switching node, and the calculation of the current rate is carried out using a basic rate for long distance calls and an amount representing the traffic load and the distance to be spanned. Thus the rate is exclusively determined by technical factors and such important customer parameters as speaking behavior and customer factors are not taken into account. As a result, there is apparently relatively small flexibility in the setting of rates. In addition, after dialing the entire number and after the display of the valid rate, one additional specific key must be pressed. Further, an ongoing measurement of the load on all lines cannot be implemented in this case even without the concrete request for this measurement by a calling subscriber and the storing of the measuring values in the switching nodes.

In addition, the reference German Patent Application No. 33 05 978 A1 purportedly concerns a system is disclosed that activates and deactivates in a time-variable manner fixed rates only. In this system, the reference appears to refer only to making the rate model, which is still used today and which provides for rate levels dependent both on distance as well as time, more flexible. The system apparently activates the rate levels as a function of the measured total network load.

SUMMARY OF THE INVENTION

Exemplary embodiments and/or exemplary methods of the present invention are directed to creating a method and a system or circuit arrangement for dynamically setting communications rates in analog and digitized communications networks and taking into account the specific degree of capacity utilization of the communication network at the time of a particular call attempt such that, given a high traffic load on the communications infrastructure, the use or utilization of the network is more expensive than given a smaller load, an effective control of the traffic load being achievable as a result of a continuous traffic control that is influenced by the specific spatial and temporal situation in the network.

Further exemplary embodiments and/or exemplary methods of the present invention are directed to dynamic communications rate setting in digitized communications networks which is based, in principle, on the continuous measurement—performed by traffic measuring equipment—of the loads carried by all lines above the subscriber line level. The values measured may be stored in a system or circuit in special rate calculators, or rate "pre-calculators," where they are available on demand. The traffic measuring equipment may be connected to rate calculators which jointly constitute the load measuring groups. Rate combination calculators located at the corresponding exchanges may be used to combine the rate weighting factors of the high-usage routes with those of the main route (final route) in accordance with certain parameters defined by the carrier in order to obtain new rate weighting factors which will be passed on to the next highest level. The actual rate calculators may be located at the line terminations at the terminal exchanges. The hardware may be implemented either as separate units or as components such as modular printed circuit boards at digital exchanges. Depending on the structure of the digital switching equipment, the three components of the dynamic communications rate setting system may be implemented, in part or as a whole, as software elements incorporated in the program system of the exchange.

Further exemplary embodiments and/or exemplary methods of the present invention are directed to providing dynamic communications rate setting which may be based on the following or combinations of the following:

1. The loads carried by all lines above the subscriber line level are continuously measured. The values measured are stored in special rate calculators where they are available on demand.
2. The amount of traffic load determines the rate which is payable for a particular call and has to be determined using a special algorithm. The algorithms used for the calculation are stored as programs in the rate calculators.
3. The rate payable for a particular call is shown, for example, on the display of the calling telephone after all digits of the trunk code of the destination network have been dialed. Immediately after the input of the last digit of the trunk code, the corresponding rate calculator uses the latest data measured for the traffic flowing to that destination to calculate the rate that is valid at that moment and show it on the display of the calling telephone. This means that all subscribers should have a telephone having a display at their disposal. However, it is also possible to use a personal computer, a connected printer, a fax, or other type of communications equipment for the call and the display. Even announcements using synthetic speech are imaginable and technically feasible.
4. Unless further digits are dialed after the input of the trunk code, the system will remain, for a certain time (for instance, five seconds) in this offer-making status in order to enable the subscriber to decide whether to have the conversation at the rate displayed or to interrupt the dialing process, for example, by replacing the receiver. When the "time granted for decision-making" has elapsed, the dialing process will be discontinued by the system.

5. If the subscriber dials the number of the person he wishes to call, the charges payable for this call will be calculated according to the rate displayed.

6. The charges actually payable for this call will be displayed on the telephone of the calling subscriber upon completion of the call.

7. Dynamic communications rate setting is also applicable to large local networks since it is possible, in principle, to use a dynamic method for setting the rates payable for all local calls outgoing to other exchange areas. As soon as the calling subscriber has dialed the code of the exchange he wishes to access, the rate valid at that moment will be transmitted, in the same way as for trunk calls, by the rate calculator to the calling terminal to be displayed there. If the subscriber continues dialing, the call charges will be calculated according to the rate displayed as in the case described above.

Dynamic communications rate setting in digitized networks may be suitable both for voice communications and for any other type of electronic communications such as video, data and fax transmission.

Exemplary embodiments and/or exemplary methods of the present invention may be directed to eliminating entirely the dependence on distance, for example, by measuring the loads carried by cross connections and according to the numbering scheme. In this case, the only yardstick used for calculating the rates may be the line utilization, i.e., in the case of the heavy use of a dialed line, a higher rate may be calculated than in lighter use. Moreover, a flexible rate setting system may be achieved with the aid of an algorithm calculating the current rate by setting parameters (weighting factors); in this way, for instance, minimum and maximum rates can be set. In an equally simple way, it is possible to introduce parameters for special rates into the algorithms. An equivalent solution can be implemented for specifying discounts for frequent callers or major users. The minimum rate should cover, for instance, the cost price, whereas the maximum rate payable in the event of high traffic loads should represent the maximum price accepted by the customer. The achievable maximum price level can be identified by international comparisons and market research. The rates may always apply to the entire duration of a call, i.e., a higher rate will be charged for calls initiated after an increase in traffic load whereas this does not hold for calls already in progress at that particular moment. In the reverse case, this principle shall apply accordingly. Moreover, program modifications may be introduced that will enable the algorithm to include in the call rates international factors characteristic of different types of international calls. Thus, exemplary embodiments and/or exemplary methods of the present invention may allow an entirely dynamic communications rate setting to be implemented both in digital and analog networks, as a result of which, rate setting on the basis of the specific actual traffic load of the network structure may be realized.

DETAILED DESCRIPTION

Figure 1:
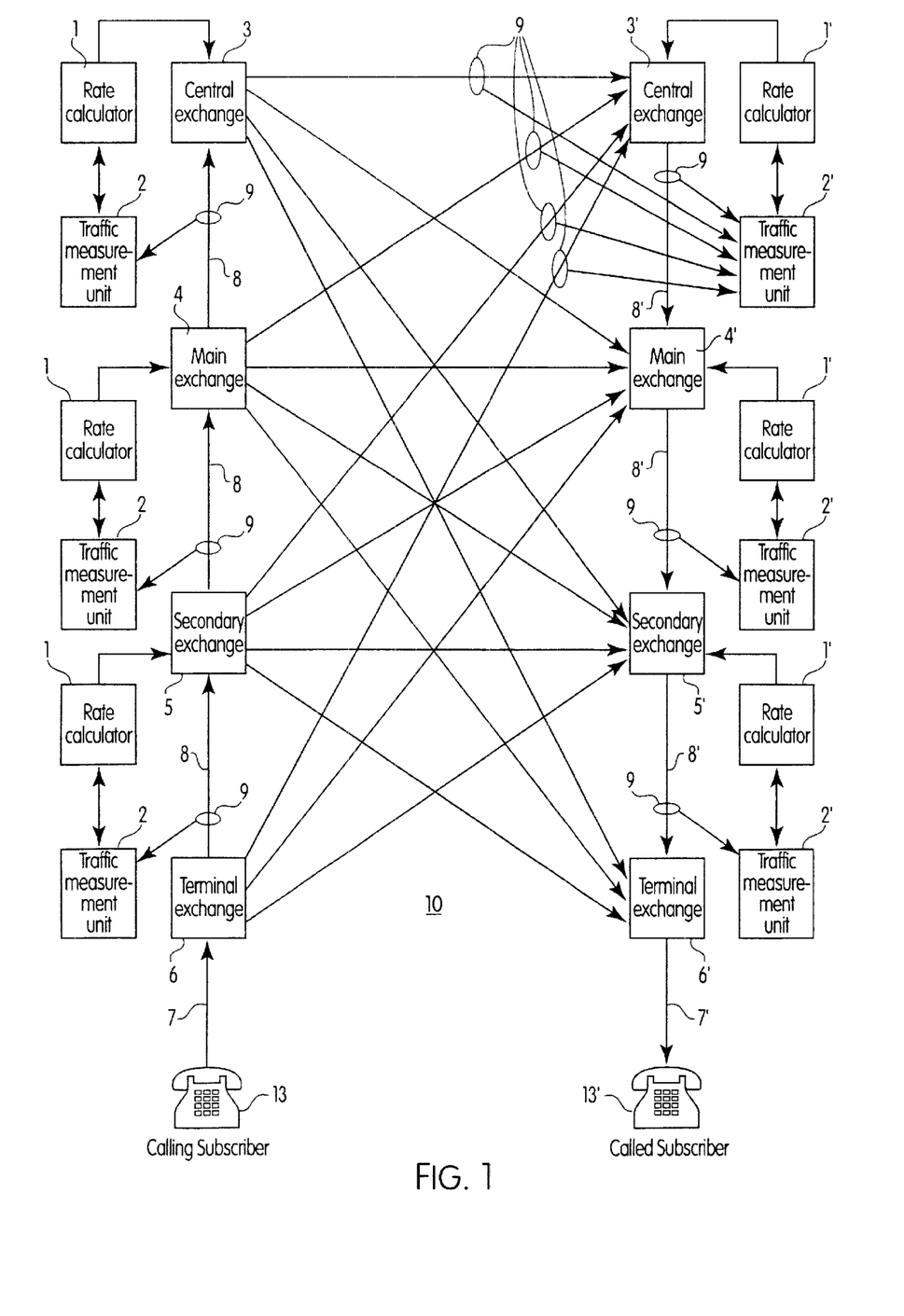
FIG. 1 shows a circuit diagram of an exemplary system of the present invention.

FIG. 1 shows a circuit diagram of an exemplary system structure according to the present invention used in analog network hierarchies for the load measurement and rate weighting required for dynamic communications rate setting, in which both at the calling and the called subscribers ends, the diagram shows a hierarchic network structure. It may be composed of terminal exchanges 6 and 6', secondary exchanges 5 and 5', main exchanges 4 and 4' and central exchanges 3 and 3'. Each exchange is connected to a rate calculator, or rate "pre-calculator," 1 or 1'. Each rate calculator 1 or 1' may be connected to a traffic measurement unit 2 or 2' which, in turn, is linked up with trunks 8 and 8' between the exchanges mentioned above. Rate calculator 1' for central exchange 3', moreover, may be connected to a traffic measurement unit 2' which, as an example of all other traffic measurement units 2' at the called subscriber's end, may be linked up with all lines between terminal exchange 6, secondary exchange 5, main exchange 4, and central exchange 3 at the calling subscriber's end and central exchange 3' at the called subscriber's end. The traffic flows to the exchanges below central exchange 3' may be measured accordingly (load measurement). In addition, there exists a direct connection between the corresponding exchanges above terminal exchanges 6 and 6' and the called subscriber and there is also a connection to each exchange at the calling subscriber's end, such as secondary exchange 5', main exchange 4' and central exchange 3' at the called subscribers end.

This exemplary system structure or circuit may be used for continuous measurement of the traffic loads carded by all lines above the level of subscriber lines 7 and 7'. The loads measured may be stored in rate calculators 1 and 1' where they are available on demand. The rate payable for a particular call may be determined by a special algorithm as a function of the load measured. The algorithms used to calculate the load weighting factor and the call rates may also stored in rate calculators 1 and 1'. The rate payable for a particular call may be shown on the display of the telephone or terminal of the calling or called subscriber after the trunk code of the destination network has been dialed completely. Immediately after the input of the last digit of the trunk code of the local network to be accessed, the corresponding rate calculator 1 or 1' uses the latest data measured for the traffic flowing to that destination to calculate the rate valid at that moment, showing it on the display of the calling telephone. Unless further digits are dialed after the input of the trunk code, the system will remain for a certain time (for example, five seconds) in this offer status in order to enable the subscriber to decide whether to make the call at the rate displayed or to interrupt the dialing process, for instance, by replacing the receiver. When "time granted for decision making" has elapsed, the dialing process will be discontinued by the system. In large local networks, the geographic location of the called subscriber may have an influence on the rate. In this case, the exemplary system may use the display device of the telephone and an acoustic signal to demand the input of the next three digits in order to be able to calculate the current rate. This is only significant for the "rate inquiry" function.

If the subscriber dials the number of the person he wishes to call, the charge payable for this call will be calculated according to the rate displayed. The charges actually payable for this call will be displayed on the terminal of the calling subscriber upon completion of the call. Depending on the performance features provided by the calling terminal, it is also possible to display the charges accumulating during a telephone call. Dynamic communications rate setting can also be applied to large local networks. In principle, it is possible to use a dynamic communications rate setting system for all local calls outgoing to other exchange areas. As soon as the calling subscriber has dialed the code of the exchange he wishes to access, just as with trunk calls, the currently applicable rate is transmitted by rate calculator 1 to the calling terminal and is displayed there. If the subscriber continues dialing, the call rate will again be calculated according to the dynamic rate displayed, and inquiries about call charges will be dealt with as in the case described above.

Since the only signals transmitted in digital networks are pulses—regardless of the type of communications—dynamic communications rate setting may be suitable both for voice communications and any other type of electronic communications in the fields of multimedia, data and video transmissions, etc. Moreover, in a further embodiment, the dependence on distance may be entirely eliminated, for example, by measuring the loads carried by cross connections and according to the numbering scheme. In this case, the only yardstick used for calculating the rates would be the line utilization, i.e., in the case of heavy use of a dialed line a higher rate will be calculated than with lines having lighter use. Moreover, a highly flexible rate setting system may be achieved with the aid of an algorithm calculating the current rate by setting parameters (weighting factors) in rate calculators 1 and 1'. In this way, for instance, minimum and maximum rates can be set. In the algorithms, parameters for special rates such as are required for specifying discounts for frequent callers or major users may be included. The minimum rate should cover the cost price, and the maximum rate payable in the event of high traffic loads should represent the maximum price accepted by the customer. The achievable maximum price level can be identified, for instance, by international comparisons and market research. The rates may always apply to the entire duration of a call. If a higher rate is charged for calls initiated after an increase in traffic load, this does not hold true for calls already in progress. In the reverse case, this principle shall apply accordingly, its application being indispensable, moreover, to provide reliable rates to the customer. In addition, so-called international factors characteristic of different types of international calls can be included in the call rates via the algorithm. If this system was introduced worldwide, there would no longer be any need for fixed special rates. In this case, carriers would everywhere collect their charges from calling subscribers only. This solution would have no effect on compensation payments which may have been agreed among certain carriers.

If inquiries about rates are made by customers accessing the local network without dialing the subscriber number (only for the purpose of obtaining information), such information can be provided as a special service offered, for example, for payment of a fixed rate which may be billed along with the charge payable for the call if it is actually made. If the call fails to materialize, the inquiry may be itemized and charged in the statement.

Dynamic communications rate setting may also be applied to the "International Free Phone Service (IFS)" standardized by the ITU. In this case, it is necessary to transmit the calculated call weighting factors to the called rather than the calling subscriber. Such data can be transmitted using a slightly modified type of signaling. The rate information will be indicated at the called subscriber's terminal by a display device activated by the dynamic communications rate setting system.

Figure 2:
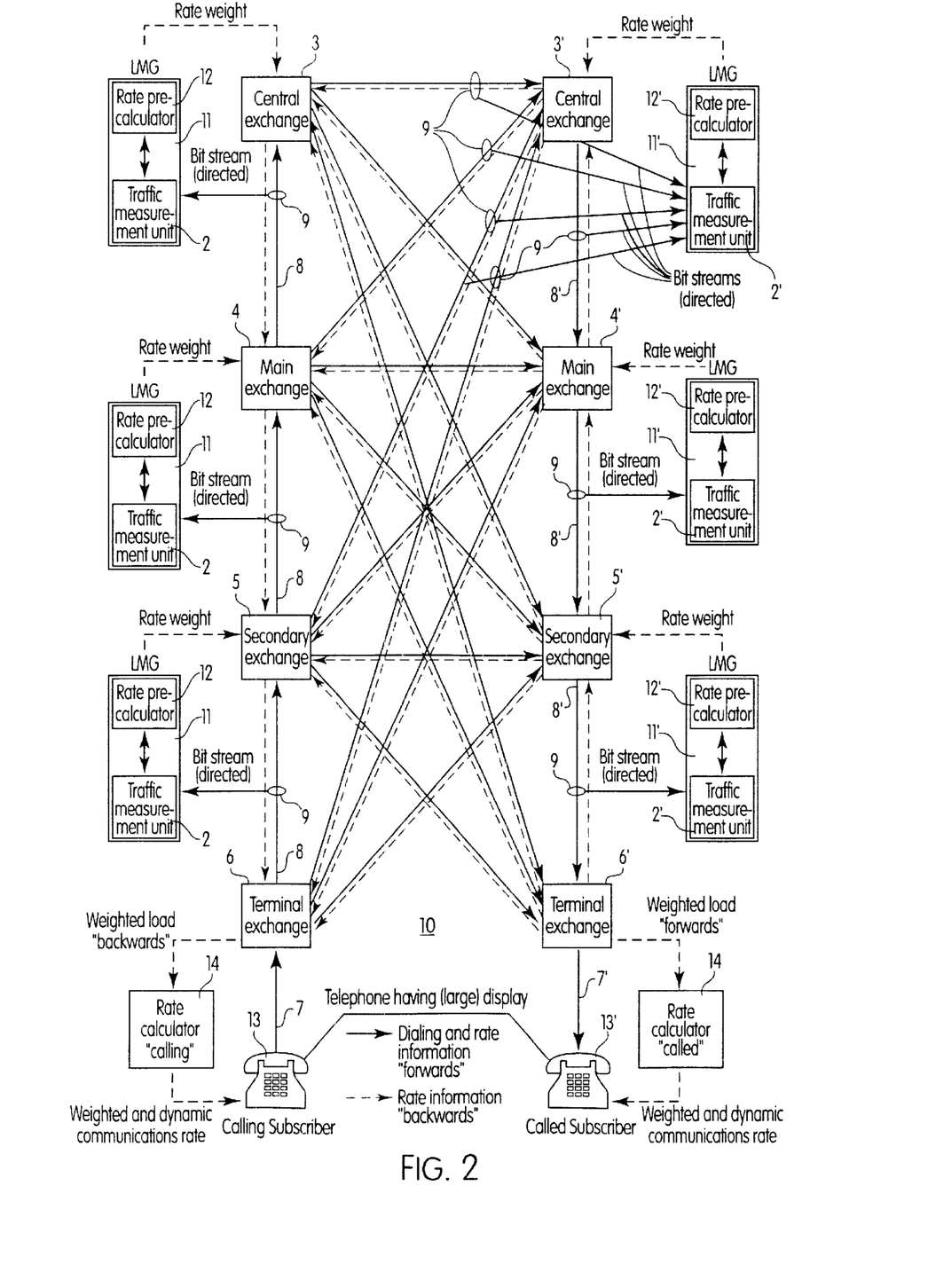
FIG. 2 shows a modification of the exemplary system according to FIG. 1.

Being shown the number of the calling customer, the subscriber requested to pay for the call by the "International Freephone Service" is free to decide whether or not to accept the call. Thus, it has been made evident that dynamic communications rate setting is practicable without difficulty both in analog and digital networks and that dynamic communications rate setting may be adopted for the services presently offered by carriers without there being any problems or constraints to overcome. The system structure depicted in FIG. 2 contains all possibilities of setting up a national trunk call as shown in FIG. 1. In addition, high-usage routes are plotted between terminal exchanges 6 and 6' and the higher levels of the analog network hierarchy which do not exist in the analog network although they can be implemented without technical difficulties in digital networks. The most important equipment used for dynamic communications rate setting as shown in FIG. 2 is composed of traffic measurement units 2 and 2' which, in connection with rate calculators 1 and 1', constitute the load measuring groups 11 and 11'. A load measuring group 11 (or 11') may be composed of a traffic measurement unit 2 (or 2') and a rate precalculator 12 (or 12'). Rate combination calculators located at the exchanges are used to combine the weighting factors of the high-usage routes with those of the main route (final route) in accordance with certain parameters defined by the carrier in order to obtain new weighting factors which will be passed on to the next level; this is depicted in FIG. 2. Rate calculators 14 and 14' in the strict sense of the term are connected, as shown in FIG. 2, to the terminals, i.e., to the terminations of the lines at the exchanges 6 and 6'. These devices may be implemented either as separate units or components such as modular printed circuit boards. Depending on the structure of the digital switching system, the three components of the dynamic communications rate setting system may be implemented, in part or as a whole, as software elements in the form of certain programs or subprograms integrated in the program system of the exchange. The telephones shown in FIG. 2 (bottom) may also represent other terminals such as fax equipment, personal computers, or other types of multimedia equipment. The solid lines having arrowheads represent the dialing information plus the rate information in the forward direction, whereas the broken lines having arrowheads represent the rate information in the backward direction. The rate calculator serving terminal 13 of the calling subscriber in the area of terminal exchange 6 receives, from terminal exchange 6, the weighted load conveyed "in the backward direction," via the broken line to the output for transmitting the directional and dynamized rate to the corresponding terminal 13 to be displayed there. At the called subscribers terminal (13'), the corresponding "called" rate calculator receives, from terminal exchange 6', the weighted load conveyed "in the forward direction" via the broken line to the output for transmitting the weighted and dynamized rate to the called subscriber 13' to be displayed there. The central task of load measuring group 11 lies in automatic measurements, performed at specified intervals, of the traffic flow on the test link and, hence, of the load carried by the line or trunk groups under test. The measured values are weighted by the corresponding rate pre-calculator with the aid of the weighting factor belonging to that particular test link. For this purpose, it receives, via a switching network, a directional bit stream from the corresponding test link. Via the links drawn as broken lines, the computed rate weighting factor is transmitted by load measuring group 11 to the corresponding exchange. Rate weighting is based on a rate algorithm which, being defined in accordance with the requirements of a particular carrier and using appropriate factors, weights the measured load of a link or part of it, enabling, in this way, an almost unlimited flexibility to be achieved in the rate structure, as will be explained in more detail in the following sections. The weighted load value, i.e., the rate weight TG, is then transmitted, as part of the signaling information, to the next lower hierarchy level to calling subscriber 13. Call rate calculator 14 located at terminal exchange 6 will then convert this value into the rate valid at that moment to be displayed by the calling terminal 13.

By connecting load measuring group 11 at the upper hierarchy levels of the system for the purpose of data exchange, a regionally applicable mean load value can be determined and weighted, to be adopted as a basic value for the algorithm used to compute the dynamic communications rate.

In the same way, by connecting the load measuring groups at the trunk level, an average basic load of a particular remote area, which, in turn, can be appropriately weighted to serve as a basis for secondary levels, can be determined.

This may also allows international calls to be included in the dynamic communications rate setting process. Assuming international agreement, this exemplary solution can be used worldwide as a standardized dynamic communications rate setting system. Assuming that the calling subscriber 13 is the recipient of the bill and that, in a first approximation, the border-crossing traffic in both directions yields nearly identical traffic flows, this approach may entirely eliminate the need for compensation payments, which complicate the rate setting process.

If the call setup is accompanied by a continuous determination of the corresponding traffic load or rate weight of the line sections, which are transmitted in the form of combination rate weights, for instance, as part of the signaling information, to the next level of the connection, this will result in the "forward setup" of the rate setting information. Having received a special IFS identification (international Freephone Service), this forward setup will be recognized and displayed by called terminal 13' as soon as the call is set up even before the receiver is lifted by the called subscriber. According to a further variant of the process, the called subscriber can be informed by optical and/or acoustic signals of his obligation to pay for the incoming call if he accepts it.

In the following, some different methods used for traffic load measurement are described:

a) the traffic incoming at the destination exchanges is recorded and classified according to transmission direction and call duration by special computers equipped with test probes (or by programs of the switching software) and converted into load values. These values are transmitted, as part of the signaling information, by the destination exchange to the calling exchange. This method uses the latest "past value" measured in the load test for evaluating the current situation. As a consequence, the measurement interval is highly significant for the reliability of this approach. Load tests performed at intervals of approximately one minute are regarded as sufficient; other intervals may be used as deemed necessary.

b) Each "main route" reports its traffic load to the preceding exchange. There, a weighting factor still to be defined is used to determine the cost-relevant rate weight TG. (The Hamburg-Munich route, for instance, carries a traffic load of 90 percent, the weighting factor being 10 on a 1-to-10 scale. Consequently, the rate weight in this example is 90 on a 1-to-100 scale).

c) The "busy-group" instances occurring in the past are counted and converted into maximum load values. This allows heavy traffic hours to be determined by means of a "busy factor."

d) The power consumption of a switching computer is used to measure its traffic load. The reference variable, in this case, is the power consumption in the idle condition. The power consumption increases with increasing computer activity.

e) Instead of the power consumption of the switching computer, it is also possible to use the sum of single instances of power consumption of the microprocessors incorporated in the switching computers.

f) The load classified according to transmission directions is derived from the recorded and analyzed signaling data (using, for instance, signaling system No. 7) and converted into load values. The result obtained is composed, for example, of load values which are measured in "calls per time unit" and related to the total number of calls for which transmission capacity is available in the particular direction.

g) Various methods used to analyze data streams on transmission channels are already being offered on the market. Hewlett Packard, for instance, has developed a system known as "Call Behavior Analysis (CBA)" allowing the call behavior of telephone users to be analyzed by specific measurement techniques.

A Network Call Simulator (NCS) may be available by Trend Communications in California, USA, a manufacturer specializing in measurement and test devices for telecommunications problems, the simulator permitting high-bit-rate digital traffic to be simulated. NCS is purportedly used to test networks under extreme conditions and up to maximum loads.

The ATM Load Test Generator may be available by Trend Communications for tests of ATM networks carrying extremely high traffic loads.

Rate setting algorithms are the instrument of rate setting. In them all variables deemed to be relevant to the process are interrelated by mathematical operations.

EXAMPLE

Weighted rate $T_k$ payable for a call is determined as follows:

$$Tk = k \cdot load \cdot basic\ rate$$

where k=weighting factor
For instance, $$k = (route\ assessment \cdot speech\ behavior)/customer\ factor\ldots)$$

Thus, the price P of a call is $$P = T_k \cdot t$$

where t=duration of the call.

Hence, the price of a call is calculated according to the following equation:

$$P = t \cdot \frac{\text{route assessment} \cdot \text{speech behavior} \cdot \text{load} \cdot \text{basic rate}}{\text{customer factor}} \quad 5$$

The "route assessment factor" allows routes to be weighted which are heavily frequented. In principle, however, there is no absolute need for such weighting.

The "speech behavior factor" is intended to account for the influence of large numbers of short-term calls (business traffic) or small numbers of long-term seizures (Internet surfing) or "social" communications (aged people, teenagers) in the local network.

The "customer factor," describes the type of customer: occasional caller, long-term caller, international caller, network surfer, etc. In this way, both discounts for major users and surcharges payable on small quantities can be defined.

Since the weighting factors cover a range of 1 to 10, k may assume values between 1 and 100.

This example is merely intended to aid in the understanding of the possibilities and the high flexibility inherent in such a system. Further weighting factors may be defined, if necessary, and integrated in the algorithm. Of course, the algorithm must again be adapted to the goal to be achieved.

An "offering" status of the system may be implemented by extension of the switching software. In the case of "normal" dialing, i.e., in the absence of delays occurring between the individual selection stages, the system operates in the usual way. The input of further digits prevails over the waiting time of the offer status. Only in cases where an expected additional digit is not dialed, does the system enter the waiting cycle. The recommended duration of this cycle is approximately 10 to a maximum of 15 seconds.

Figure 3:
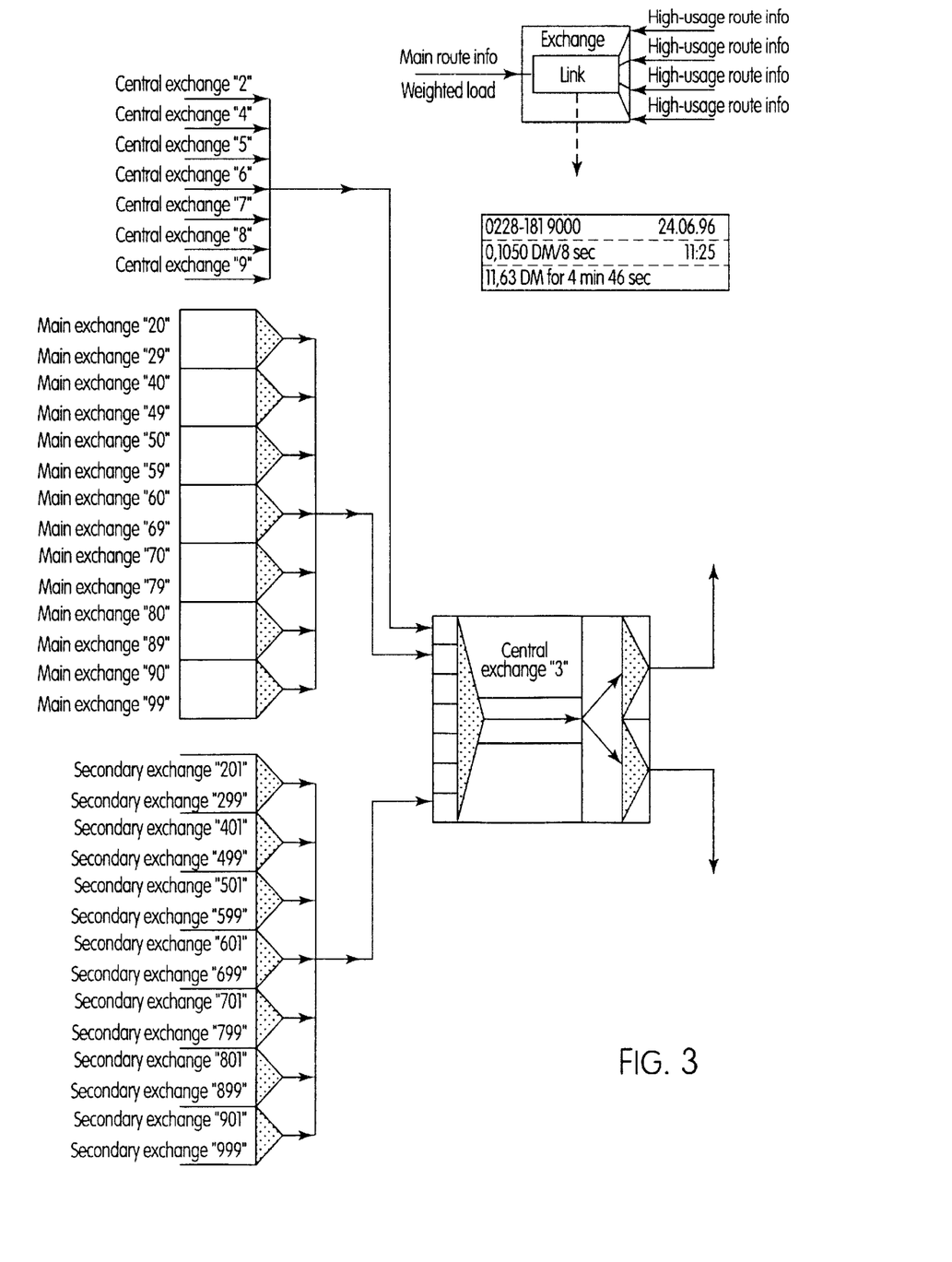
FIG. 3 shows rate weights in the example of a central exchange.

FIG. 3 shows, as an example, the way in which rate weights may be determined for a central exchange. Central exchange 3 is connected to central exchanges 2 and 4 to 9, main exchanges 20 to 29, 40 to 99, and secondary exchanges 201 to 299 and 401 to 999. At one output, central exchange 3 supplies the central exchange weighting factor for standard service provided in the direction of the calling subscriber and, at the other output, the central exchange weighting factor for "International Freephone Service" (IFS) in the direction of the called subscriber. FIG. 3 includes an outline of the rate calculator located at an exchange, receiving the weighted load contained in the main route information and, on the other hand, the high-usage-route information. This data is combined by the rate calculator to obtain the rate information to be displayed at the terminal or telephone of the subscriber. An example of the information displayed is shown in the box defined by dark lines.

Figure 4:
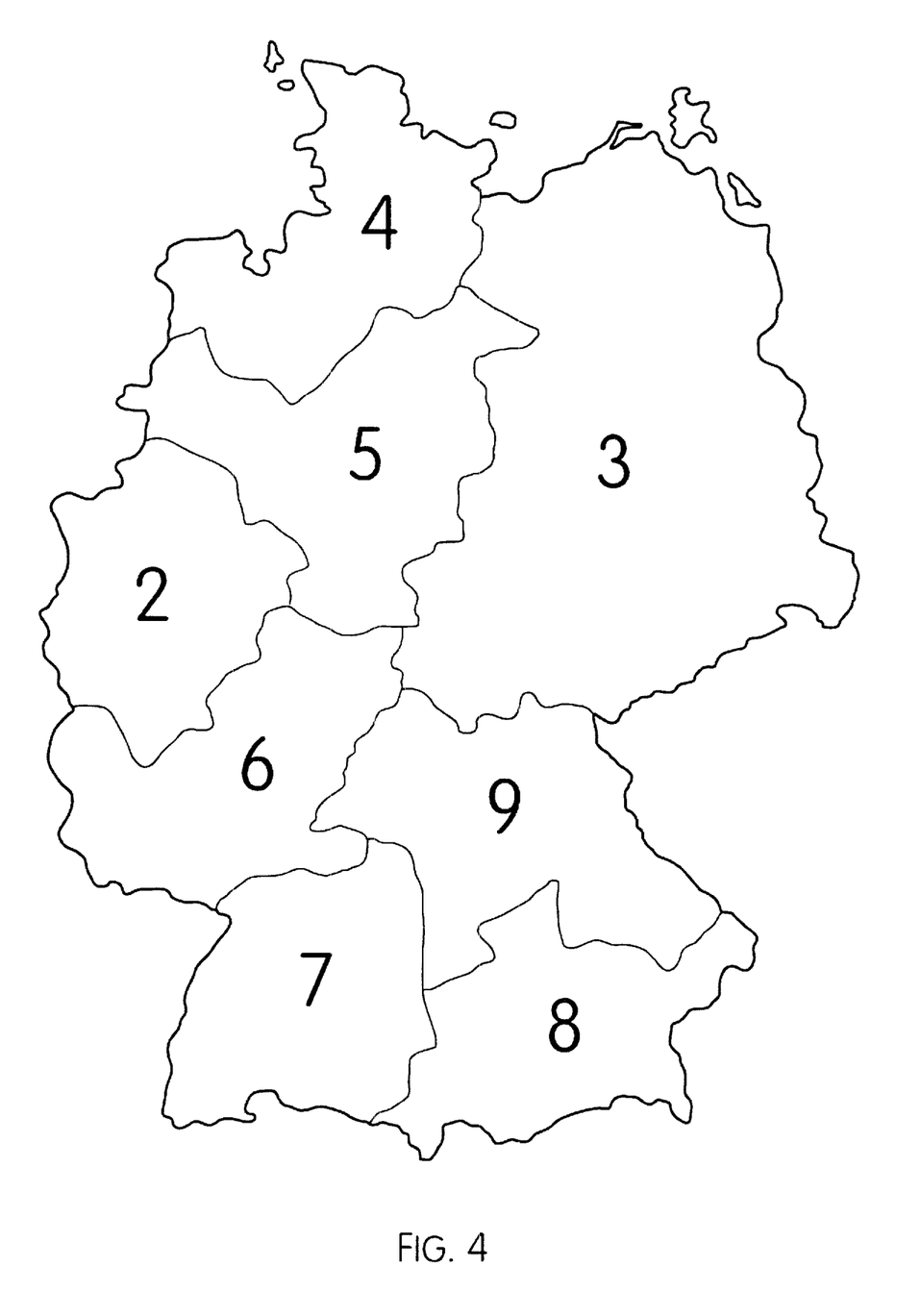
FIG. 4 shows a division of a country (for example, Federal Republic of Germany) into code areas.
Figure 5:
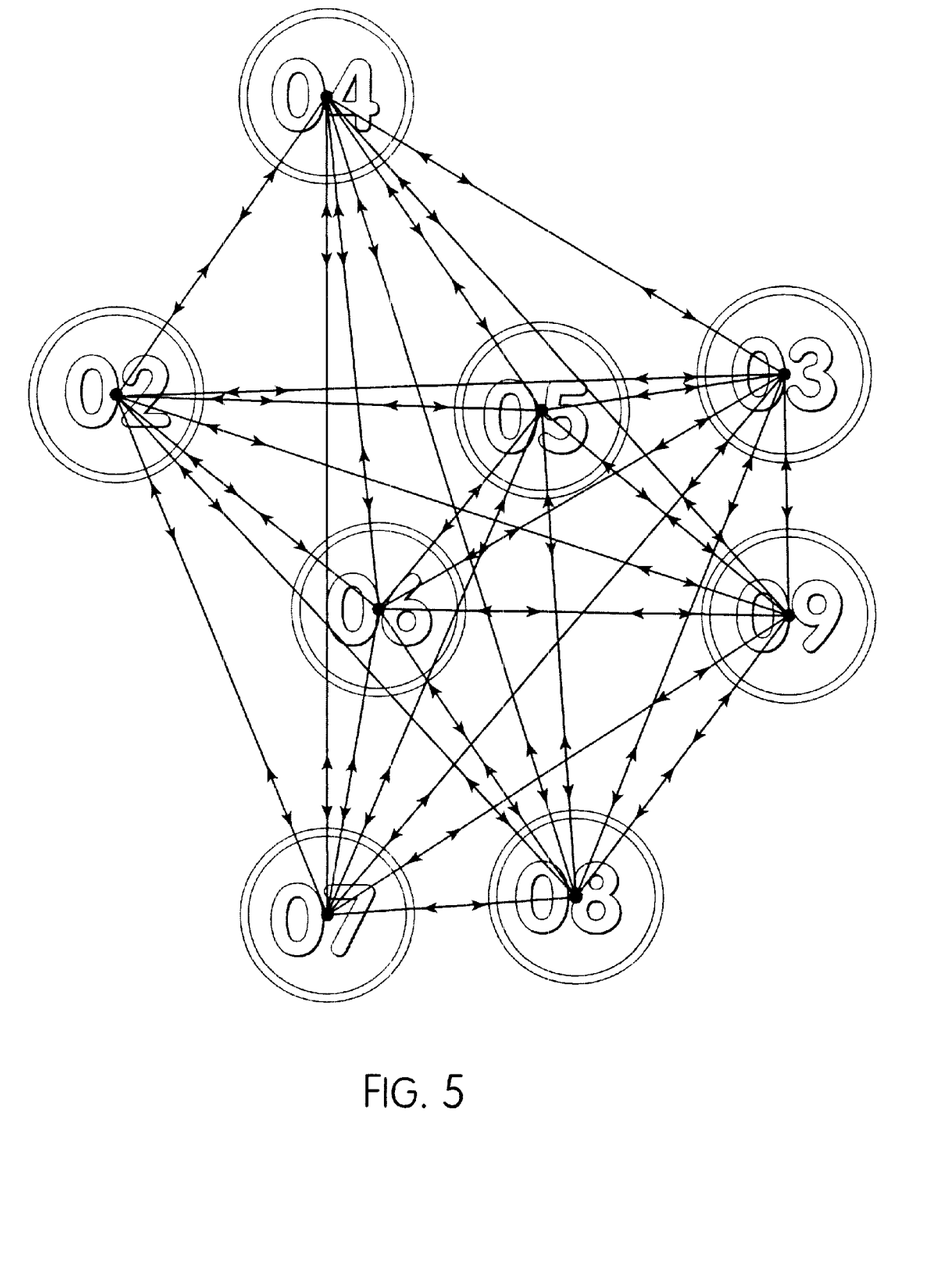
FIG. 5 shows a depiction of the data streams flowing among central exchanges.

FIG. 4 shows the division of a territory into code areas. Among the central exchanges of these code areas, data streams are transmitted as shown by the example in FIG. 5.

Figure 6:
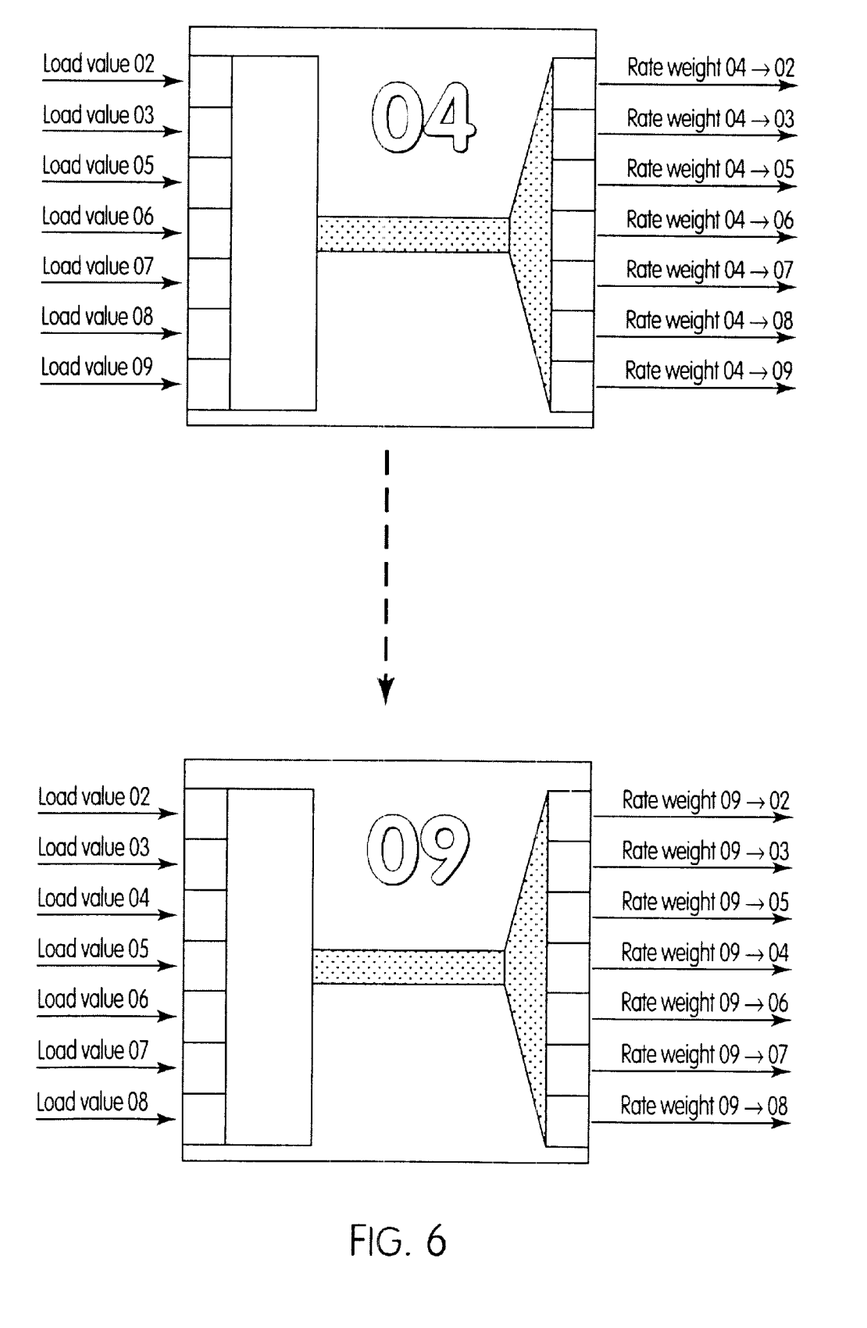
FIG. 6 shows load values/rate weights for "standard operation".

FIG. 6 shows the load values and traffic weights required for dynamic communications rate setting in the case of standard service provided between the central exchanges of the 04 and 09 areas. The measured loads are shown at the input and the calculated rate weights at the output.

Figure 7:
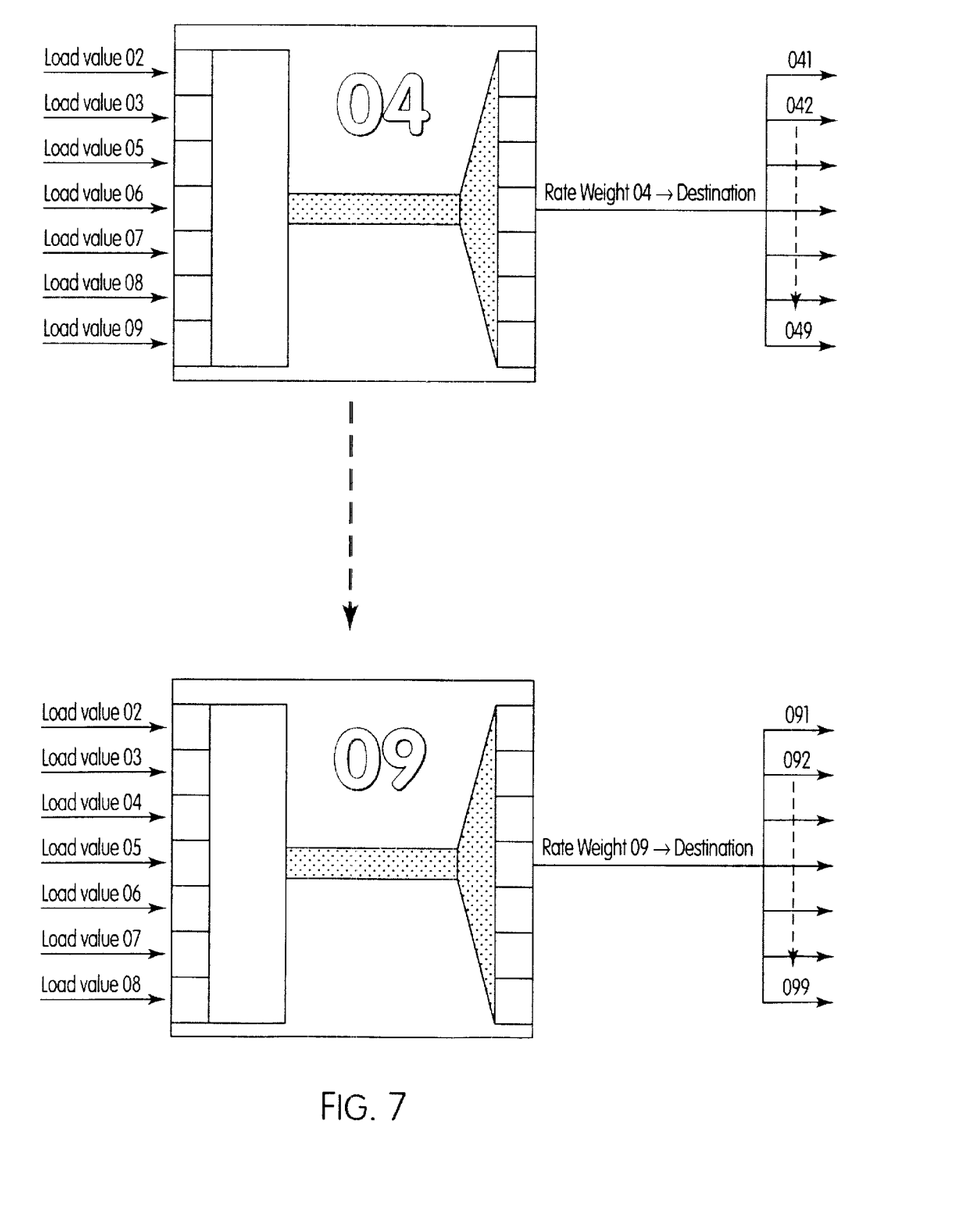
FIG. 7 shows load values/rate weights for "International Freephone Service (IFS)."

FIG. 7 shows the loads/traffic weights used for dynamic communications rate setting in the "International Freephone Service" (IFS). As for the above exemplary embodiments and/or exemplary methods of the present invention, the measured values are supplied to the computers located at the exchanges which use this data to calculate the corresponding rate weights, the transmission direction being recognized or derived, for example, from the signaling information.

What is claimed is:

1. A method for a rate setting in a communications network comprising:

continuously measuring a traffic load on at least one of a trunk line and a trunk line group of the communications network above a subscriber terminal line level so as to define a plurality of respective current traffic loads;

storing programs in a plurality of rate calculators, the programs for determining current rates of individual calls as a function of at least one of the plurality of respective current traffic loads, the current rates being available upon demand;

determining a first current rate of a first individual call using at least one of the plurality of rate calculators;

transmitting to a first terminal associated with a calling first subscriber the first current call rate after a dialing of a first trunk code of a destination network, the transmitting using at least one of the rate calculators;

displaying on the first terminal the first call rate of the first individual call after the dialing of the first trunk code of the destination network;

maintaining an offer status for a time when a dialing process including the dialing of the first trunk code is paused after the dialing of the first trunk code, the dialing process being continued after the time for maintaining the offer status upon one of a positive decision by the first subscriber and interrupted; and displaying a first call charge on at least one of the first terminal and a second terminal using at least one of optical signals, acoustic signals, printed letters and synthetic speech, the second terminal being associated with a called subscriber.

2. The method as recited in claim 1 wherein the determining is performed as a function of the respective current traffic loads corresponding to the respective at least one of the trunk line and the trunk line group corresponding to a signal path of the first individual call.

3. The method as recited in claim 1 wherein the communications network is digital or analog, and is at least one of a wire, radio-supported terrestrial, laser-supported terrestrial, and satellite communications network.

4. The method as recited in claim 1 wherein the determining is performed so as to achieve a distance-independence of the rate setting.

5. The method as recited in claim 1 wherein the programs include weighting factors established using at least one algorithm, the weighting factors being variable so as to establish at least one of minimum rates, maximum rates, special rates, and discounts for frequent callers and major users.

6. The method as recited in claim 1 wherein the communications network includes a plurality of exchanges, and further comprising:

calculating a plurality of respective weighted load values corresponding to each of the respective current traffic loads using a respective load measuring group associated with each exchange; and combining the respective weighted load values corresponding to the respective at least one of the trunk line and the trunk line group corresponding to a signal path of the first individual call as a function of pre-defined parameters.

7. The method as recited in claim 1 wherein the communications network includes a plurality of exchanges, and wherein the continuously measuring is performed using a power consumption of a switching computer or of corresponding microprocessors of at least one of the exchanges, signaling data being used to determine a transmission direction of a respective current traffic load.

8. The method as recited in claim 7 wherein an idle power consumption state of the respective switching computer or of the corresponding microprocessors of each respective corresponding exchange is used as a reference.

9. A system for rate setting in a hierarchical communications network, the system comprising:
- a plurality of exchanges including terminal exchanges;
- at least one of a plurality of trunk lines and trunk line groups interconnecting the plurality of exchanges;
- a load measuring group associated with each of the plurality of exchanges higher in the hierarchy than the terminal exchange, each load measuring group including:
  - a traffic measurement unit coupled to at least one of a respective set of the trunk lines and a respective set of the trunk line groups for measuring traffic loads in the set; and
  - a rate pre-calculator connected to the traffic measurement unit and to the associated exchange; and
- a plurality of rate calculators including programs for determining current rates of individual calls using traffic data from at least one of the load measurement groups, the current rates of individual calls being available upon demand.

10. The system as recited in claim 9 wherein the at least one of the plurality of trunk lines and trunk line groups includes cross connections of the communications network.

11. The system as recited in claim 9 wherein the communications network is digital or analog, and is at least one of a wire, radio-supported terrestrial, laser-supported terrestrial, and satellite communications network.

12. The system as recited in claim 9 further comprising a first terminal associated with a first subscriber and a second terminal associated with a second subscriber, and wherein the plurality of rate calculators includes a first subscriber rate calculator for determining current rates of individual calls from the first terminal and a second subscriber rate calculator for determining current rates of individual calls from the second terminal.

13. The system as recited in claim 12 wherein the first subscriber rate calculator is disposed between the first terminal and the first terminal exchange, and a second subscriber rate calculator disposed between the second terminal and the second terminal exchange.

14. The system as recited in claim 9 wherein the programs for determining the current rates of individual calls include weighting factors established using at least one algorithm, changes in the weighting factors being used to establish at least one of minimum rates, maximum rates, special rates, and discounts for frequent callers and major users.

15. The system as recited in claim 9 wherein the rate pre-calculators are capable of calculating respective weighted load values corresponding to the measured traffic loads in a set for use by the plurality of rate calculators for determining current rates of individual calls.

16. The system as recited in claim 14 further comprising switchable lines capable of transmitting dialing and rate information to the second terminal and of transmitting the rate information to the first terminal, the switchable lines including radio channels.

* * * * *